UNITED STATES PATENT OFFICE.

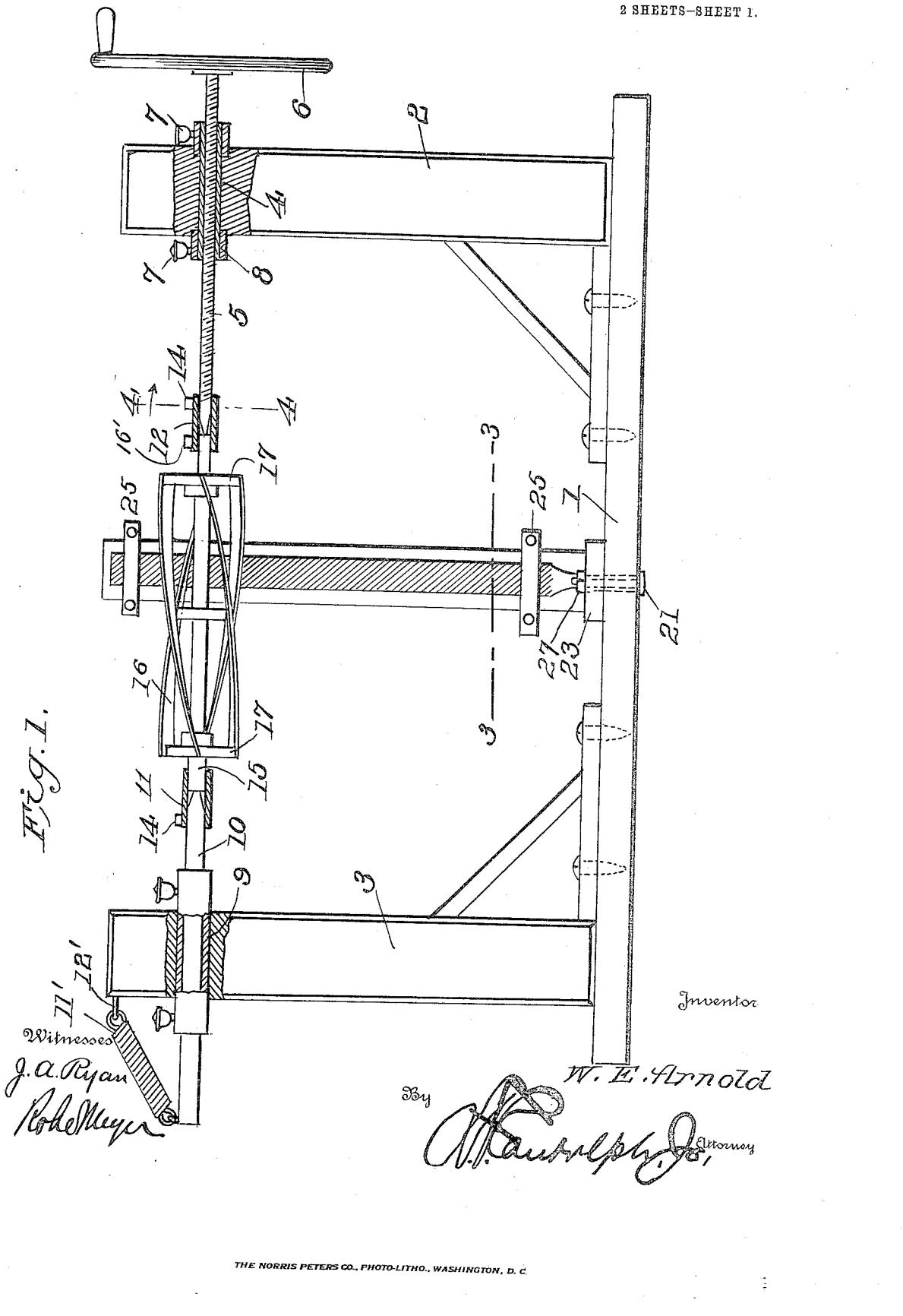

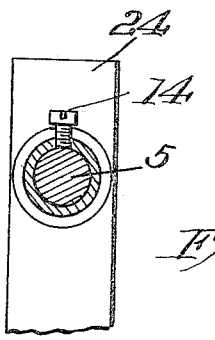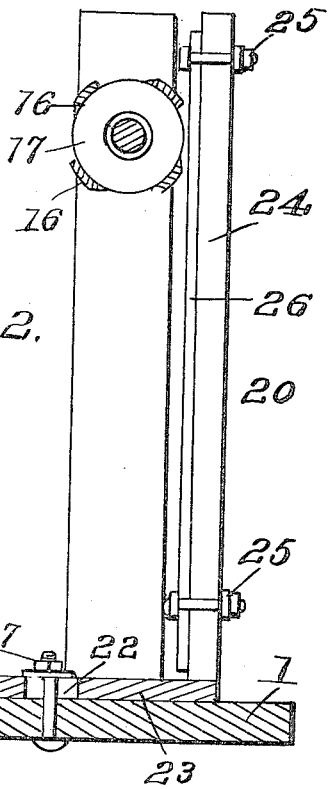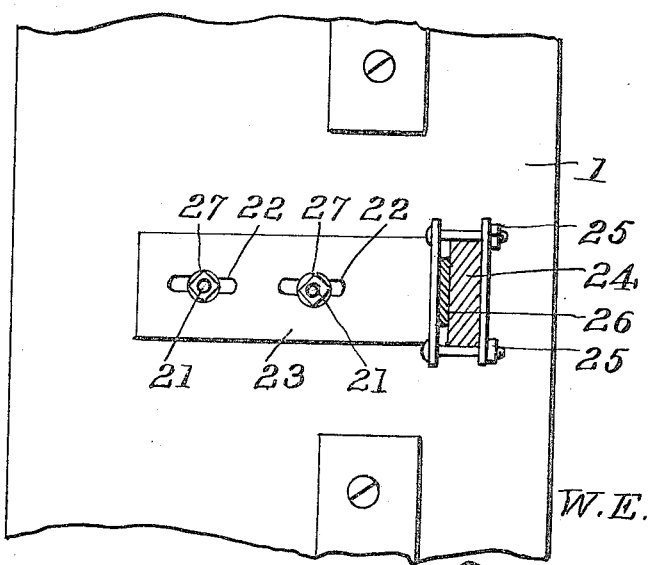

WILLIAM E. ARNOLD, OF OMAHA, NEBRASKA.

LAWN-MOWER SHARPENER.

1,123,975.

Specification of Letters Patent.

Patented Jan. 5, 1915.

Application filed June 2, 1914. Serial No. 842,446.

*To all whom it may concern:*

Be it known that I, WILLIAM E. ARNOLD, a citizen of the United States, residing at Omaha, in the county of Douglas and State of Nebraska, have invented certain new and useful Improvements in Lawn-Mower Sharpeners, of which the following is a specification.

This invention relates to improvements in lawn mower cutting blade sharpeners, and the primary object of the invention is the provision of a structure for sharpening the blades of a lawn mower by rotating the blades so that they will engage a sharpening element during their rotation and also to provide means for feeding the lawn mower blades longitudinally along the sharpening element so as to efficiently sharpen each and every part of the blades.

With the foregoing and other objects in view, this invention consists in such novel features of construction, combination and arrangement of parts as will be hereinafter more fully described, illustrated in the accompanying drawings, and claimed.

In describing the invention in detail reference will be had to the accompanying drawings, wherein like characters of reference designate like or corresponding parts throughout the several views, and in which:—

Figure 1 is a view in side elevation of the improved lawn mower cutting blade sharpener, showing parts thereof broken away. Fig. 2 is a vertical sectional view through the sharpener, Fig. 3 is a fragmentary sectional view taken on the line 3—3 of Fig. 1, and Fig. 4 is a cross sectional view on the line 4—4 of Fig. 1.

Referring more particularly to the drawings, 1 designates the base of the lawn mower sharpener, which has two upright posts 2 and 3 mounted thereupon and secured thereto in any suitable manner. The vertical upright 2 has a sleeve 4 extending transversely therethrough, adjacent its upper terminal end, which sleeve is provided with internal screw threads and has adjustably seated therein an externally screw threaded rod 5, which rod has a hand wheel 6 mounted upon its outer terminal end. Suitable lubricating devices 7 are carried by collars 8, which are mounted upon the sleeve 4 and provide for the proper lubrication of the working of the rod 5 within the sleeve 4. The upright 3 has a sleeve 9 extending transversely therethrough, which sleeve has a rod 10 slidable longitudinally therein. The rod 10 has a coil spring 11' connected to its outer terminal end, which coil spring is also connected to an eyelet 12' carried by the upper terminal end of the post 3, and the spring tends to force the rod 10 inwardly toward the central portion between the two vertical posts, and being securely connected to the rod it will limit the inward movement of the rod.

The rods 5 and 10 have their inner terminal ends tapered, as is clearly shown in Fig. 1 of the drawings. The rods 5 and 10 have sleeves 11 and 12 mounted upon their inner free ends, which sleeves are held against rotation or against longitudinal movement upon the ends of the rods by set screws 14. The sleeves 11 and 12 receive the terminal ends of the central shaft 15 of the rotary cutting blade 16 of a lawn mower. The rotary cutting blades of the lawn mower are constructed in the usual manner, having a plurality of arcuate blades disposed about end supporting pieces 17, so that upon rotation of the cutter blades they will cut grass or the like. A set screw 16' is inserted through the sleeve 12 and engages the outer surface of the protruding end of the shaft 15 of the lawn mower blades, so that the cutter will rotate synchronously with the rotation of the rod 5 by the hand wheel 6.

The base 1 of the lawn mower sharpener has an angle plate 20 secured thereto by bolts 21, which bolts are adjustably seated in the slots 22, which slots are formed in the base 23 of the angle plate 20. The vertical portion 24 of the angle plate 20, has straps 25 carried adjacent its upper and lower ends, which straps are provided for binding a file or other sharpening element 26 upon the vertical standard 24.

By the adjustability of the bolts 21 in the slots 22, the sharpening element 26 may be adjusted or moved forwardly or rearwardly, so as to properly engage the knives of the rotary cutter 16 of the lawn mower, for efficiently sharpening them in the operation of the lawn mower cutter sharpener.

In the operation of the improved sharpener for rotary cutting blades of lawn mowers; the rotary cutting blades are positioned intermediate the facing ends of the rods 5 and 10, being mounted for synchronous rotation with the rod 5 by the sleeve 12, and the file or other sharpening element 26 is positioned by the loosening of the nuts 27, which hold the bolts 21 in adjusted positions in the slot 22, and the moving of the bolt within the slot so that it will be positioned properly for engagement with the knives of the rotary cutter. After the rotary cutter 16 of a lawn mower has been properly positioned, the rod 5 is rotated through the medium of the hand wheel 6, which will rotate the cutting element of the lawn mower, causing the blades to contact with the surface of the sharpening element 26. The cutting element 16 of the lawn mower will be fed longitudinally by the longitudinal adjustment of the rod 5 within the sleeve 4, which adjustment will be occasioned through the medium of the screw threads formed upon the rod in the sleeve, upon the rotation of the rod by the hand wheel. The spring 11 will tend to force the rod 10 inwardly and will keep the same properly positioned at its inner end in engagement with the end of the shaft 15 of the lawn mower cutting blade 16, at all times during the rotation and longitudinal movement thereof.

From the foregoing description, taken in connection with the accompanying drawings, the advantages of the construction and of the method of operation of the improved lawn mower sharpener will be readily apparent to those skilled in the art to which this invention appertains, and, while in the foregoing the principle of the operation has been described, together with various features of construction, it is to be understood that certain minor features of construction, combination and arrangement of parts may be altered to suit practical conditions, provided such alterations are comprehended within the scope of what is claimed.

What is claimed is:—

1. In a sharpener for the rotary cutting blades of a lawn mower, a supporting structure, a rotatable rod carried by said supporting structure, a slidable rod carried by said supporting structure, said rods being positioned in alinement with each other for supporting the cutting blades of a lawn mower therebetween, a sharpening element carried by said supporting structure and movable toward or from the axes of said rods, and means for moving said rotatable rod longitudinally upon rotation thereof for moving the cutting blades of a lawn mower along said traveling element.

2. In a sharpening device for the rotary cutting element of a lawn mower, a supporting structure having vertical uprights secured thereto, an internally screw threaded sleeve carried adjacent the upper end of one of said vertical uprights, an externally screw threaded rod adjustably extending through said internally screw threaded sleeve, a rod slidably seated in the other of said vertical uprights, said rods being provided for supporting a rotary cutting element of a lawn mower between their meeting ends, whereby said rotary cutter will be synchronously rotated and moved longitudinally upon the rotation of said screw threaded rod, and a sharpening element adjustably carried by said supporting structure for movement toward or away from said rod for conforming to the size of various rotary cutters of lawn mowers.

In testimony whereof I affix my signature in presence of two witnesses.

WILLIAM E. ARNOLD.

Witnesses:
E. L. DROST,
H. R. WHEELER.

Copies of this patent may be obtained for five cents each, by addressing the "Commissioner of Patents, Washington, D. C."